Nov. 26, 1935.	H. C. LORD ET AL	2,022,213

JOINT

Filed Sept. 24, 1932

Hugh C. Lord
Thomas Lord
INVENTORS

BY
ATTORNEYS.

Patented Nov. 26, 1935

2,022,213

UNITED STATES PATENT OFFICE 2,022,213

JOINT

Hugh C. Lord and Thomas Lord, Erie, Pa.; said Thomas Lord assignor to said Hugh C. Lord Application September 24, 1932, Serial No. 634,762

5 Claims. (Cl. 287—100)

The present invention is designed to improve joints and as exemplified is used in connection with securing a cross pin of a spring joint in its shackle, or bracket. In this connection and in many connections, it is desirable to secure the joint parts very rigidly and securely together. The present invention is designed to make such a rigid connection and to provide a slight take-up so that as the joint is subjected to jar of the parts in use it will effect a loosening of the joint. Features and details of the invention will appear from the specification and claims.

A preferred embodiment of the invention is illustrated in the accompanying drawing as follows:—

Figure 1:
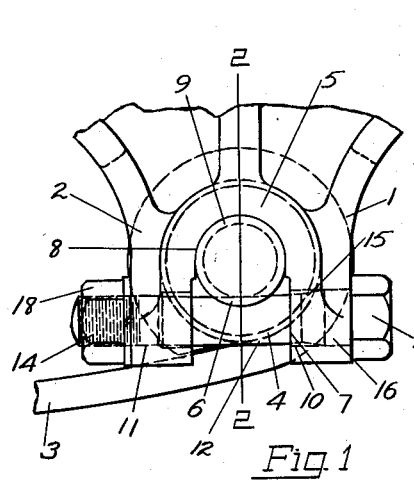
Figure 2:
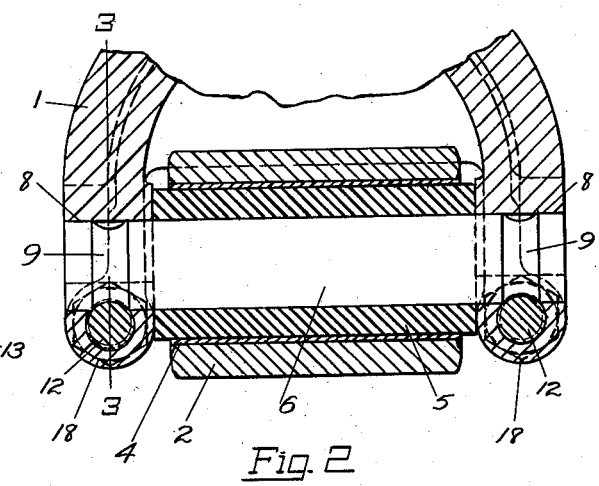
Figure 3:
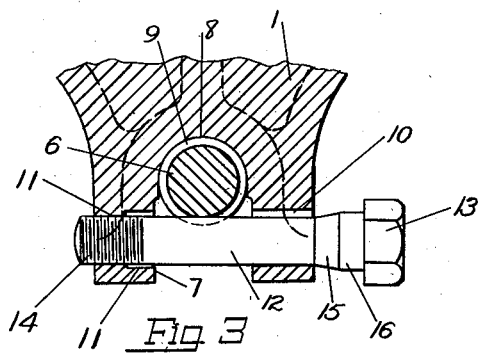
Figure 4:
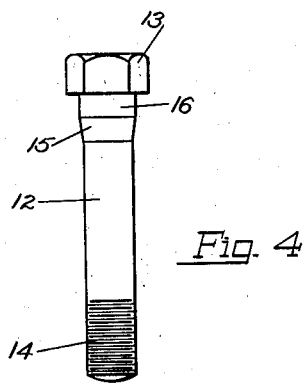
Figure 5:
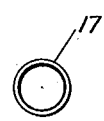
Figure 6:
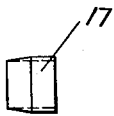

Fig. 1 shows an end elevation of the joint.
Fig. 2 a section on the line 2—2 in Fig. 1.
Fig. 3 a section on the line 3—3 in Fig. 2.
Fig. 4 a detached view of a cross securing bolt.
Fig. 5 an end view of a wedge ring.
Fig. 6 a side elevation of such a ring.

1 marks the joint support. This may be in the form of a bracket, or shackle, or other form of support depending on the use to which the invention is put. 2 marks a spring eye, and 3 a spring of an ordinary automobile. Arranged in the spring eye is a joint comprising an outer shell 4, a rubber bushing 5, and a central pin 6. The central pin extends endwise from the ends of the bushing and extends into slots 7 at the lower ends of the forked support. This slot 7 extends to the edge of the support and is preferably of a width to permit the assembly of the joint pin by a movement of the cross pin in a direction across its axis. The slot terminates in a semi-cylindrical seat 8 on which the joint pin 6 seats. The joint pin preferably has the grooves 9 which for convenience of manufacture and assembly may be annular.

The side walls of the slot 7 have openings 10 and 11 for receiving a bolt 12. The bolt is provided with a head 13 and screw threads 14. The opening 11 is of the normal size of the bolt and the opening 10 is somewhat larger. The bolt 12 has a wedge surface 15 terminating in a cylindrical surface 16 next to the head 13. The cylindrical surface 16 makes a reasonable fit with the opening 10.

The parts are so proportioned that with the joint pin on its seat, as shown in Fig. 3, the small portion of the bolt 12 will pass through the opening 11 and engage the joint pin at the groove and the bottom surface of the opening 10. With the parts in this position, the nut 18 is applied and the bolt 12 drawn endwise into place. As the wedge surface 15 enters the opening 10 it forces the cross pin 12 crosswise gradually putting the bolt 12 under strain and definitely clamping the joint pin on its seat. It will be noted that as the cross pin is drawn into place and subjected to the lateral pressure through the wedging action that the pin is deflected and for this purpose the pin should have some elasticity and to the extent of its elastic limit it has a take-up which prevents the jarring loose of the joint. If the tolerances are such that the pin is actually deflected beyond the elastic limit no particular harm is done because up to the elastic limit it still has the take-up. In this way the joint is made rigid and under very severe conditions as to jarring is maintained in that rigid condition.

The wedge surface and cylindrical surface 16 may be formed integrally with the bolt, or if desired, may be formed by a separate ring 17.

Preferably the opening 11 is slightly enlarged at the end next the slot at 19 and the cylindrical surface 16 terminates at a point comparatively remote from the joint pin so that the bridged space between the supports of the cross pin gives considerable length to the cross pin to permit of its resilient deflection.

It will be noted that as the cross bolt is drawn home and the head of the bolt engages the wall of the bracket, or shackle, the side walls of the slot may be slightly deflected inwardly, thus assisting in the clamping action and the tensile pull on the bolt tends to straighten it and thus adds to its engagement with the joint pin.

What we claim as new is:—

1. In a joint, the combination of a joint member comprising a joint pin; a support having an open slot terminating in a seat for receiving the joint pin; a cross pin bridging and closing the slot and engaging the joint pin, said cross pin and support having engaging surfaces, one of which surfaces is wedging and adapted through the camming action of the engaging surfaces as the cross pin is advanced on the support to force the cross pin laterally relatively to the support, the engaging surfaces, seat and joint pin being so related as to clamp the joint pin on the seat through such lateral movement of the cross pin; and means of engagement between the cross pin and the support at the sides of the slot putting the cross pin under tension in that part of the cross pin bridging the slot.

2. In a joint, the combination of a joint member comprising a joint pin having a groove with curved walls; a support having an open slot terminating in a seat for receiving the joint pin;

and a cross pin bridging and closing the slot and engaging the joint pin in the groove, said cross pin having a curved surface corresponding to the curve of the groove having wedging surfaces engaging the walls of the support and adapted through the camming action of the engaging surfaces as the cross pin is advanced on the support to force the cross pin laterally relatively to the support, the engaging surfaces, seat and joint pin being so related as to clamp the joint pin on the seat through such lateral movement of the cross pin.

3. In a joint, the combination of a support having a slot extending to its edge and terminating in a joint seat, the walls of the slot being provided with openings, the opening in one wall being larger than the opening in the opposite wall; a joint pin seated on the joint seat; and a cross pin extending through the openings and engaging the joint pin, said cross pin having a wedging surface engaging the walls of the larger opening and adapted through the camming action of the wedging surface as the cross pin is advanced on the support to force the cross pin laterally relatively to the support, the engaging surface, seat and joint pin being so related as to clamp the joint pin on the seat through such lateral movement of the cross pin, the points of support for the cross pin by the walls of the openings being outwardly spaced from the sides of the slot.

4. In a joint, the combination of a joint member comprising a joint pin; a support having an open slot terminating in a seat for receiving the joint pin; a cross pin bridging and closing the slot and engaging the joint pin, said cross pin and support having engaging surfaces, one of which surfaces is wedging and adapted through the camming action of the engaging surfaces as the cross pin is advanced on the support to force the cross pin laterally relatively to the support, the engaging surfaces, seat and joint pin being so related as to clamp the joint pin on the seat through such lateral movement of the cross pin with pressure resiliently deflecting the cross pin in the bridged space; and means of engagement between the cross pin and the support at the sides of the slot putting the cross pin under tension in that part of the cross pin bridging the slot.

5. In a joint, the combination of a support having a slot extending to its edge and terminating in a joint seat, the walls of the slot being provided with openings, the opening in one wall being larger than the opening in the opposite wall; a joint pin seated on the joint seat; and a cross pin arranged in the openings engaging the joint pin, said cross pin having a wedging surface and adapted through the camming action of the wedging surface as the cross pin is advanced in the openings to force the cross pin laterally relatively to the support, the engaging surfaces, seat and joint pin being so related as to clamp the joint pin on the seat through such lateral movement of the cross pin, said cross pin having a head and screw, said head and screw putting the cross pin under tensile strain tending to close the sides of the slot to straighten the cross pin against the joint pin.

HUGH C. LORD.
THOMAS LORD.